United States Patent [19]

Campbell et al.

[11] Patent Number: 4,510,741
[45] Date of Patent: Apr. 16, 1985

[54] ROTARY CROP BALER

[75] Inventors: Hallis D. Campbell; Donald E. Burrough, both of West Bend, Wis.

[73] Assignee: Gehl Company, West Bend, Wis.

[21] Appl. No.: 591,275

[22] Filed: Mar. 19, 1984

[51] Int. Cl.³ ............................................. A01D 39/00
[52] U.S. Cl. ........................................ 56/341; 100/88
[58] Field of Search ................... 56/341, 343; 100/88, 100/89, 76, 5

[56] References Cited

U.S. PATENT DOCUMENTS 4,172,354  10/1979  Vermeer ............................... 56/341
4,273,036   6/1981  Kopaska ............................... 56/341

Primary Examiner—Jay N. Eskovitz
Attorney, Agent, or Firm—James E. Nilles

[57] ABSTRACT

A pickup at the front of a rotary crop baler discharges crop material rearward between crop guiding means comprising a feed roller that propels the material farther rearward. Rearwardly adjacent to the feed roller is a bale forming roller with a diameter about twice that of the feed roller, rotating in the same direction as the feed roller and at the same or a slightly faster peripheral speed. The bale compacting belt assembly has the usual expandable lower stretch defined by two rollers, one of which is spaced above the crop guiding means, the other of which is rearwardly adjacent to the bale forming roller. During an initial stage of core formation that stretch of belt slides on the bale forming roller and cooperates with it, with the feed rollers and with retractable bale forming fingers, to define a bale starting chamber more nearly cylindrical than heretofore.

9 Claims, 3 Drawing Figures

ROTARY CROP BALER

FIELD OF THE INVENTION

This invention relates to rotary crop balers whereby cut crop material such as hay is picked up and formed into cylindrical bales, and the invention is more particularly concerned with a rotary baler having a bale starting chamber of more nearly circular cross-section than that of prior rotary balers and therefore more effective in forming a compact bale core with very dry and very short crop materials as well as with more usual crop materials.

BACKGROUND OF THE PRIOR ART

A rotary crop baler of the general type to which this invention relates is disclosed in U.S. Pat. No. 3,914,926 to Braunberger et al. U.S. Pat. Nos. 4,257,219, to Burrough et al, and 4,244,167, to Seefeld et al, disclose improvements in such a machine. All of those patents have a common assignee with this application.

In general, a rotary crop baler comprises a frame mounted on wheels to be towed behind a tractor or the like and having opposite upright side walls. A pickup means on a front portion of the frame picks up cut crop material as the baler moves forward, discharging the material rearwardly towards a gap between upper and lower feed rollers that rotate on parallel horizontal axes and extend from one to the other of the side walls on the frame. The feed rollers, which are driven for rotation in opposite directions, cooperate to deliver the crop rearwardly into a bale forming zone, where the crop is confined between a rearwardly moving supporting surface and a forwardly moving surface, to be rolled into a cylindrical bale. The forwardly moving surface is defined by endless compacting belt means trained around belt rollers that have their axes parallel to those of the feed rollers, and particularly by an expandable stretch of the compacting belt means that extends between a pair of lowermost belt rollers. One of those lowermost belt rollers is located over the feed rollers, the other is spaced farther to the rear. Some of the other belt rollers around which the compacting belt means is trained are movable in a shuttle arrangement that maintains the expandable stretch under yielding lengthwise tension so that it can be displaced upwardly between the two lowermost belt rollers. As the bale forms and grows in diameter, it forces the expandable stretch upward and is at the same time contained by that stretch, which embraces the bale while imposing a radially compressive force upon it.

In the rotary crop balers of the above mentioned patents, the lower one of the two feed rollers did not directly engage the incoming crop but was, instead, a front one of a set of conveyor rollers arouhd which was trained a lower belt that had an upper, rearwardly moving platform stretch. The upper feed roller thus cooperated with the front portion of the platform stretch to feed crop rearwardly into the bale forming zone, the crop being carried rearwardly on the platform stretch, which was located beneath the expandable stretch of the compacting belt means. FIGS. 2 and 5 of the drawings in the above mentioned Seefeld et al patent depict the manner in which the lower belt cooperates with the compacting belt means in developing a bale core and forming a bale.

It was obviously desirable to eliminate the lower belt if a satisfactory substitute for it could be devised, in order to avoid the inevitable problems involved in maintaining that belt tensioned around its supporting and driving rollers and in repairing or replacing it from time to time. The lower belt also had a functional disadvantage with respect to the baling of certain types of crop materials, particularly those that were cut short or were very dry and slippery. With such materials there was often difficulty in forming a satisfactory core during the initial stage of a bale forming operation. Before being displaced upward by a growing bale, the expandable stretch of the compacting belt means extended substantially horizontally, and it defined a substantially triangular bale starting chamber with the platform stretch of the lower belt, which slanted rearwardly and upwardly towards the expandable stretch. It was evident that the triangular configuration of this bale starting chamber accounted for the occasional inability to form a satisfactory core, because formation of a compact cylindrical bale core is best encouraged with a bale starting chamber that is as nearly as possible cylindrical.

Rotary balers have heretofore been devised that do not have a lower belt, and such balers have operated satisfactorily with most crop materials, but they have had bale starting chambers that departed markedly from a cylindrical configuration, and therefore the inability to form a compact bale core with dry and short cut crop materials has been common to prior art rotary balers generally.

SUMMARY OF THE INVENTION

A general object of this invention is to provide a rotary crop baler which does not have a lower platform belt and which is, accordingly, easier and less expensive to maintain and repair than prior rotary balers that had such a belt.

Another general object of this invention is to provide a rotary crop baler which consistently produces a compact bale core, with very dry and short cut crop materials as well as with more usual crop.

Thus it is a more specific object of this invention to provide a rotary crop baler that is more easily maintained and repaired than prior balers but which nevertheless provides a bale starting chamber that is more nearly cylindrical than the bale starting chambers of prior rotary balers and thus encourages the development of a compact bale core with all types of crop materials.

A further specific object of the invention is to provide a rotary baler which achieves the above stated objects and which involves only relatively minor modifications of a prior rotary baler having a lower platform belt, so that conversion from production of that prior baler to production of the baler of this invention does not require costly changes in tooling and the like.

In general, these and other objects of the invention that will appear as the description proceeds are achieved in the present rotary baler for cut crops, which is of the type that comprises a mobile frame having crop pickup means on a front portion thereof, upper and lower feed rollers near a front portion of the frame, behind the pickup means, between which crop is discharged by the pickup means and which are driven for rotation in opposite directions to cooperate in delivering the crop rearwardly to a baling zone wherein the crop is rolled to form a cylindrical core that develops into a bale of growing diameter, endless bale compacting belt means, and a plurality of spaced apart belt rollers around which said belt means is trained, one of said belt rollers being located over said feed rollers and another being spaced to the rear of said one, and said belt means being engaged upwardly against said one and said other of the belt rollers to have an expandable stretch extending between them that continuously embraces a growing bale. The rotary baler of this invention is characterized by a bale forming roller that cooperates with the lower feed roller to support and roll crop in the baling zone, said bale forming roller having a diameter substantially larger than that of the lower feed roller and having its periphery rearwardly adjacent to the periphery of the lower feed roller and forwardly adjacent to the periphery of said other belt roller. The invention is further characterized by means for rotatably driving said bale forming roller in the same direction as the lower feed roller and at a peripheral speed which is at least as high as that of the lower feed roller.

Preferably the diameter of the bale forming roller is on the order of twice that of the lower feed roller, and its axis is contained in, or is close to, a horizontal plane that contains the axis of the lower feed roller.

It is also preferred that retractable bale forming fingers project downwardly through said stretch of the endless belt means, behind the upper feed roller, to prevent crop from entering the space between said one belt roller and the upper feed roller. Thus, the bale starting chamber, in which the core portion of the bale is formed, is defined conjointly by the bale forming roller, the lower feed roller, the retractable fingers, and the stretch of said belt means that extends between said one belt roller and said other belt roller.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
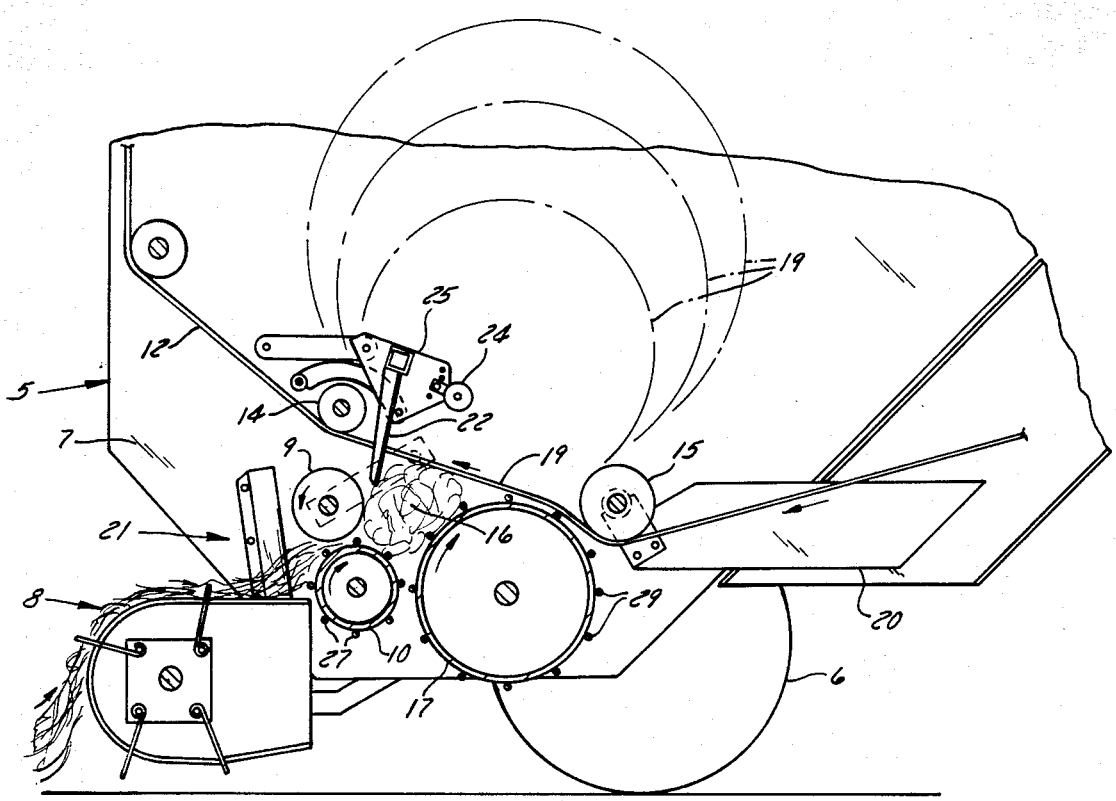
FIG. 1 is a view in vertical section of the lower portion of a rotary crop baler that embodies the present invention.
Figure 3:
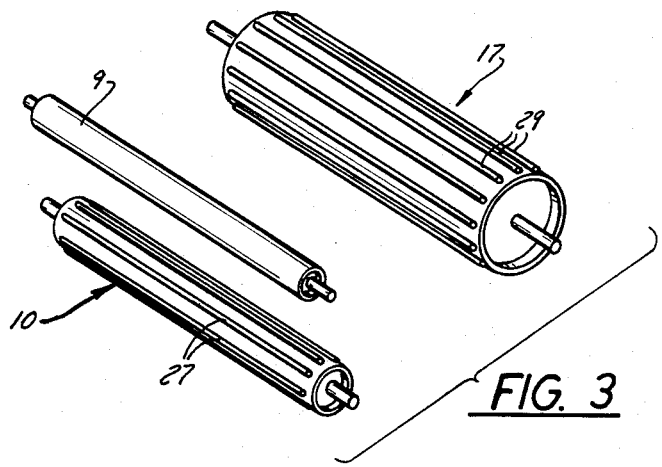
FIG. 3 is a group perspective view of the rollers that define the bale starting chamber.

In general, a rotary baler embodying the present invention comprises a machine frame 5 that is mounted on transversely spaced wheels 6 to be towed by a tractor (not shown). On the machine frame 5 there are opposite upright side walls 7, and the several rollers that are described hereinafter all extend substantially from one to the other of the side walls and have their axes horizontal and parallel to one another.

At the front of the machine is a crop pickup mechanism 8 which lifts cut crop material off of the ground as the machine is moved forward and discharges the material rearwardly into a relatively narrow gap between upper and lower feed rollers 9 and 10, respectively, that are near the front of the machine but are spaced behind the pickup mechanism.

A bale compacting belt means 12, comprising a number of identical endless belts arranged side-by-side, is trained around various belt rollers, particularly including two lower belt rollers 14 and 15. For details of the construction and arrangement of this belt means 12 and its several belt rollers, reference can be made to U.S. Pat. Nos. 3,914,926 and 4,257,219.

In general, the upper and lower feed rollers 9, 10 which are driven for rotation in opposite directions, cooperate to comprise crop guiding means whereby the incoming crop material is constrained to move rearwardly and is propelled into a baling zone behind them. During the initial stages of bale formation, when a cylindrical bale core is being formed, the baling zone comprises a bale starting chamber 16 which is directly behind the feed rollers 9, 10, and which is defined in part by the lower feed roller 10 and by a bale forming roller 17 of substantially larger diameter than that of feed roller, rearwardly adjacent to it. Cooperating with the rollers 10 and 17 in defining the bale starting chamber 16 is a lower stretch 19 of the compacting belt means 12 which extends from the belt roller 14 to the belt roller 15. During a bale forming operation, the belt roller 15 is normally located in upwardly and rearwardly adjacent relationship to the large bale forming roller 17, but it is mounted on a gate mechanism 20 (as disclosed in U.S. Pat. No, 3,914,926) so that it can be moved rearwardly away from the bale forming roller through a substantial distance, to provide for discharge of a finished bale. The belt roller 14 is located above the upper feed roller 9, in upwardly spaced relation to it. Note that the belt means 12 presses under the belt rollers 14 and 15. The front lower belt roller 14 is rotatably driven so that it causes the stretch 19 to move in a forward direction. The rear lower belt roller 15 is an idler.

As crop material accumulates in the bale starting chamber 16 it is rolled into a cylindrical bale core by cooperation of the lower feed roller 10, the bale forming roller 17, the lower stretch 19 of the belt means 12, and bale forming fingers 22 that are described below, and as the cylinder of material increases in diameter, it bears agains the stretch 19 of the belt means 12 and bulges it upwardly. As explained in U.S. Pat. Nos. 3,914,926 and 4,257,219, the belt means 12 is maintained under a yielding lengthwise tension such that as the bale grows in diameter, the expandable stretch 19 of the belt means grows correspondingly while being maintained in tightly wrapped relationship around the bale being formed.

It will be observed that the uppermost peripheral portion of the upper feed roller 9 is moving forwardly, and the lower stretch 19 of the belt means 12 is also moving forwardly. To prevent crop material from escaping forwardly from the bale starting chamber 16 through the space between those forwardly moving surfaces, retractable bale forming fingers 22 project down through the spaces between individual belts of the belt means 12. However, as the bale increases in diameter, it reaches a size at which it loops the belt stretch 19 forwardly around the belt roller 14 and itself blocks escape of crop material through the gap just mentioned. As the bale grows toward that size, the upwardly deflected stretch 19 of the belt means 12 engages an idler roller 24 on a swingably mounted bracket 25 that carries the fingers 22, swinging that bracket to a position in which the fingers are retracted and spaced from the bale and thus out of contact with the crop material. Thus, as the lower stretch 19 of the belt means 12 is deflected upward, the baling zone behind the feed rollers 9, 10 enlarges itself beyond the limits of the bale starting chamber 16, growing with the growing bale. The arrangement of the fingers 22 and the mechanism and means for effecting their retraction are fully disclosed in U.S. Pat. No. 3,914,926; therefore it is sufficient to point out that the bale forming fingers 22, in their extended position shown in FIG. 1, comprise one of the elements that define the bale starting chamber 16.

The upper feed roller 9 can be substantially identical—as to size, location and direction of rotation—with the so-called packer roller in the baler disclosed in U.S. Pat. Nos. 3,914,926 and 4,257,219, and in fact all portions of the present baler that are above the lower feed roller 10 and the large bale forming roller 17 can be essentially identical with corresponding portions of the balers of those patents.

The lower feed roller 10 occupies generally the same position as the front drive roller for the conveyor or platform belt in the balers of those patents, that is, it is spaced a small distance below the upper feed roller 9 and preferably has its axis spaced a little to the rear of a vertical plane that contains the axis of the upper feed roller. The upper and lower feed rollers 9, 10 are driven for rotation in opposite directions at substantially equal peripheral speeds. Preferably the lower feed roller 10 has a cylindrical surface upon which, however, there are axially extending ribs 27 that are spaced apart at regular circumferential intervals. The ribs 27 can comprise rods that are welded to the cylindrical surface of the roller 10, and of course their purpose is to afford a relatively positive engagement of the roller with crop material.

The bale forming roller 17 preferably has a diameter about twice that of the lower feed roller 10. Like the lower feed roller, the bale forming roller 17 has axially extending ribs 29 at uniform intervals around its periphery. It is mounted in rearwardly adjacent relation to the lower feed roller 10; that is, its axis is in or near a horizontal plane that contains the axis of the lower feed roller 10, and it is spaced from the lower feed roller by only such distance as will maintain adequate clearance. The bale forming roller 17 is driven for rotation in the same direction as the lower feed roller 10 and at a peripheral speed which is equal to that of the lower feed roller or slightly higher.

The rear one 15 of the two lower belt rollers 14 and 15, when in its operative position shown in FIG. 1, is in upwardly and rearwardly adjacent relationship to the bale forming roller 17 and is so located relative to it and to the front lower belt roller 14 that the expandable stretch 19 of the belt means 12 slides on the bale forming roller 17 until that stretch is displaced upward to some extent by a growing bale.

As is evident from FIG. 1, the bale starting chamber 16 in the rotary baler of this invention is of substantially polygonal cross-section in being jointly defined by the upper and lower feed rollers 9, 10, the bale forming roller 17, the expandable stretch 19 of the belt means 12, and the bale forming fingers 22, and therefore it is better adapted to impart a rolling motion to incoming crop material than the bale starting chambers of prior rotary balers, which were of substantially more irregular shape in cross-section.

The bottom of the bale starting chamber 16 is defined by the lower feed roller 10 in cooperation with the bale forming roller 17. Because of the relationship between those rollers 10, 17 with respect to diameters, locations of their axes and directions of rotation, crop material entering the bale starting chamber during the initial stage of a bale forming operation tends to be rolled in the trough-like zone defined by their adjacent portions and thus tends to form itself rather quickly into a cylindrical bale core. During most of the period of core formation, crop material entering the bale starting chamber 16 tends to be carried obliquely upwardly and rearwardly by the bale forming roller 17, to be brought into engagement with the forwardly moving stretch 19 of the belt means 12, then be deflected downwardly onto the incoming crop by the bale forming fingers 22, and thus be carried around in a circular movement that forms it into a cylindrical bale core. As the bale grows in diameter and deflects the stretch 19 of the belt means 12 upwardly and rearwardly around the rear lower belt roller 15, the bale as a whole moves rearward and upward and comes to be supported on the belt roller 15 and the bale forming roller 17. The belt roller 15 then acts as a pressure roller that tends to penetrate the periphery of the bale and enhances and governs its density, in accordance with principles disclosed and explained in U.S. Pat. No. 4,244,167. Also in accordance with principles disclosed and explained in that patent, a machine embodying the present invention can have deflector means 21 on its side walls 7, for reducing side sheet friction between the crop material and the interior surfaces of the side walls.

Figure 2:
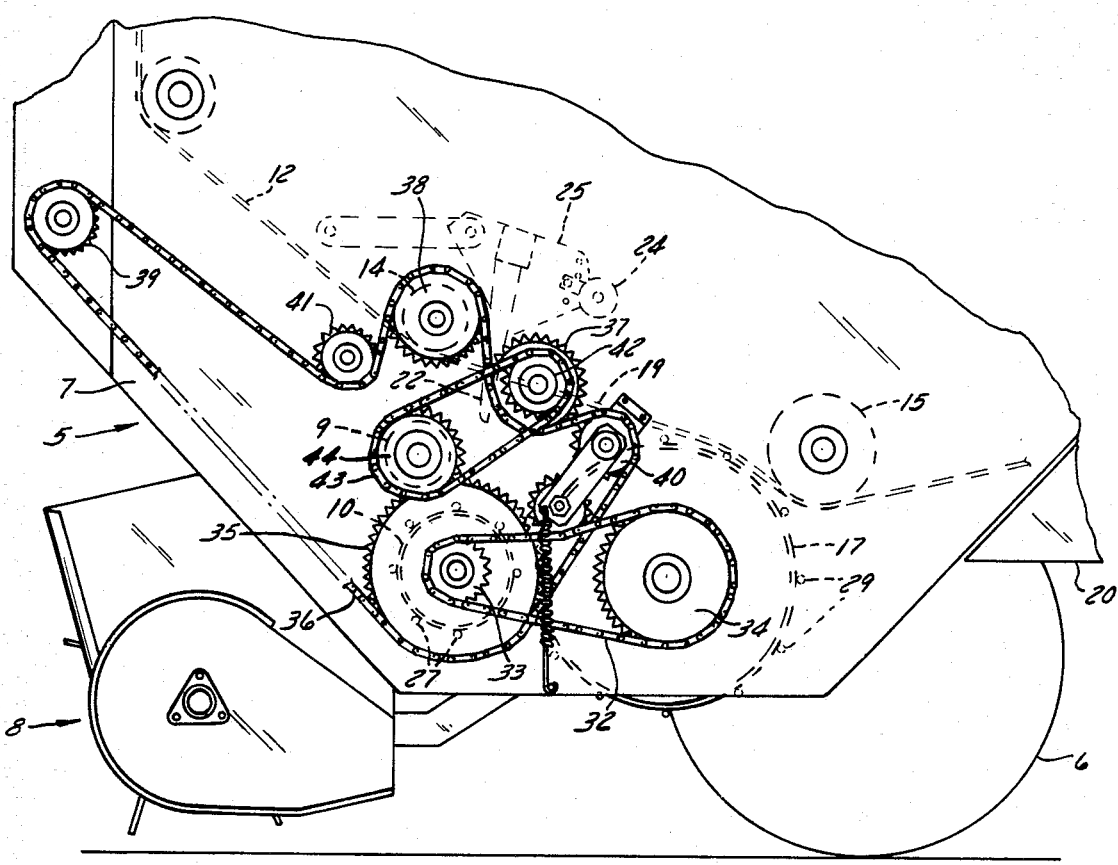
FIG. 2 is a view in side elevation of the portion of the baler shown in FIG. 1, illustrating the transmission mechanism for the several driven rollers.

As shown in FIG. 2, the lower feed roller 10 and the bale forming roller 17 can be synchronized for rotation in the same direction and at substantially equal peripheral speeds by means of a drive chain 32 which is trained around sprockets 33 and 34 that are coaxially secured to the respective rollers 10 and 17. A second and larger diameter sprocket 35 is coaxially secured to the lower feed roller 10, for coordinating its rotation with rotation of the upper feed roller 9 and of the front lower belt roller 14. Engaging the larger diameter sprocket 35 is a second drive chain 36 that is also trained around a driven idler sprocket 37, a sprocket 38 that is coaxially secured to the front lower belt roller 14, and a driving sprocket 39 that is rotatably driven from the power takeoff (not shown) of a towing tractor. The second drive chain 36 is also engaged by idler sprockets 40 and 41 that are arranged to give it adequate wrap around the other sprockets 35, 37, 38, 39 that it engages. Coaxially secured to the driven idler sprocket 37 is a driving idler sprocket 42, and a third drive chain 43 is trained around that driving idler sprocket and a sprocket 44 that is coaxially secured to the upper feed roller 9. The several sprockets have such diameter relationships that the peripheral speeds of the upper feed roller 9 and of the front lower belt roller 14 are substantially equal to the peripheral speed of the lower feed roller 10.

From the foregoing description taken with the accompanying drawings it will be apparent that this invention provides a rotary crop baler which requires less repair and maintenance than prior such balers but which nevertheless has a bale starting chamber that is more effective with very dry and short cut crop materials, being more nearly cylindrical than the bale starting chambers of prior rotary balers.

What is claimed as the invention is:

1. A rotary baler for cut crop, comprising a mobile frame having crop pickup means on a front portion thereof, crop guiding means near a front portion of the frame, behind the pickup means, to which crop is discharged by the pickup means and which comprises a feed roller over which the discharged crop passes and which is driven for rotation in a direction to deliver the crop rearwardly to a baling zone wherein the crop is rolled to form a cylindrical core that develops into a bale of growing diameter, endless bale compacting belt means, and a plurality of spaced apart belt rollers around which said belt means is trained, one of said belt rollers being located over said feed roller and another being spaced to the rear of said one, and said belt means being engaged upwardly against said one and said other of the belt rollers to have an expandable stretch extending between them that continuously embraces a growing bale, said baler being characterized by:

A. a bale forming roller that cooperates with said feed roller to support and roll crop in the baling zone, said bale forming roller
  (1) having a diameter substantially larger than that of the said feed roller and
  (2) having its periphery
    (a) rearwardly adjacent to the periphery of said feed roller and
    (b) forwardly adjacent to the periphery of said other belt roller; and
B. means for rotatably driving said bale forming roller
  (1) in the same direction as said feed roller and
  (2) at a peripheral speed which is at least as high as that of said feed roller.

2. The rotary baler of claim 1, further characterized by:
C. each of said bale forming roller and said feed roller having on its peripheral surface a plurality of circumferentially spaced axially extending ribs.

3. The rotary baler of claim 1, further characterized by:
C. said bale forming roller and said one and said other of the belt rollers being so located in relation to one another that said expandable stretch, when in undeflected condition, has sliding engagement with said bale forming roller.

4. The rotary baler of claim 1 wherein said bale forming roller has its periphery obliquely downwardly and forwardly adjacent to the periphery of said other belt roller.

5. A rotary baler for cut crop, comprising a mobile frame having crop pickup means on a front portion thereof, crop guiding means near a front portion of the frame, behind the pickup means, under which crop is discharged by the pickup means and which confines the crop to rearward motion toward a baling zone wherein the crop is rolled to form a cylindrical bale that grows in diameter, endless bale compacting belt means, and a plurality of spaced apart belt rollers around which said belt means is trained, one of said belt rollers being located above said crop guiding means and another being spaced to the rear of said one, and said belt means being engaged upwardly against said one and said other of the belt rollers to have an expandable stretch extending between them that continuously embraces a growing bale, said baler being characterized by:

A. a feed roller located in downwardly adjacent but spaced relationship to the crop guiding means and cooperable therewith to propel crop rearward toward the baling zone;
B. means for driving said feed roller to rotate in the direction for rearward propulsion of crop that the pickup means discharges into the space between said crop guide means and said feed roller;

C. a bale forming roller having a substantially larger diameter than said feed roller, said bale forming roller
  (1) having its axis near a horizontal plane that contains the axis of said feed roller,
  (2) being rearwardly adjacent to the feed roller, and
  (3) being in such forward proximity to said other one of the belt rollers as to be slidingly engageable by said expandable stretch of the belt means; and
D. means for driving said bale forming roller for rotation
  (1) in the same direction as the feed roller and
  (2) at a peripheral speed which is at least as high as that of the feed roller.

6. The rotary baler of claim 5, further characterized by: the diameter of said bale forming roller being substantially twice that of the feed roller.

7. The rotary baler of claim 5 wherein said crop guiding means comprises an upper feed roller rotatable oppositely to the first mentioned feed roller, further characterized by:
a plurality of bale forming fingers which are
  (1) extendable through said belt means to project downwardly in rearwardly adjacent relation to said upper feed roller and
  (2) retractable upwardly to a position in which they are spaced from crop material.

8. The rotary baler of claim 5, further characterized by:
said feed roller and said bale forming roller each having axially extending ribs on its peripheral surface, at circumferentially spaced intervals around said surface.

9. A rotary baler for cut crop comprising a mobile frame having crop pickup means on a front portion thereof, upper and lower feed rollers on the frame, behind the pickup means, between which crop is discharged by the pickup means and which are driven for rotation in opposite directions to cooperate in delivering the crop rearwardly to a baling zone in the frame, endless bale compacting belt means, and a plurality of spaced apart belt rollers around which said belt means is trained, one of said belt rollers being located in upwardly spaced relation to said upper feed roller and another being spaced to the rear of said one, and said belt means having an expandable stretch extending between those belt rollers, said baler further having retractable bale forming fingers cooperable with said feed rollers and said stretch to define a bale starting chamber within the baling zone, said baler being characterized by:
said bale starting chamber being further defined by a bale forming roller which
  (1) has a diameter substantially larger than that of the lower feed roller,
  (2) has its periphery
    (a) rearwardly adjacent to the periphery of the lower feed roller and
    (b) in such forwardly adjacent relation to the periphery of said other belt roller that said expandable stretch, when undeflected, slides on the bale forming roller, and
  (3) rotates in the same direction and at substantially the same peripheral speed as the lower feed roller.

* * * * *